L. JOLY.
APPARATUS FOR MEASURING THE RATIO OF TWO ELECTRIC CURRENTS.
APPLICATION FILED MAR. 14, 1911.

1,033,409.

Patented July 23, 1912.

WITNESSES:
Fred White
René Bruine

INVENTOR:
Louis Joly,
By Attorneys,
Fraser, Ward Myers

UNITED STATES PATENT OFFICE.

LOUIS JOLY, OF PARIS, FRANCE, ASSIGNOR TO JULES CARPENTIER, OF PARIS, FRANCE.

APPARATUS FOR MEASURING THE RATIO OF TWO ELECTRIC CURRENTS.

1,033,409.  Specification of Letters Patent.  Patented July 23, 1912.

Application filed March 14, 1911. Serial No. 614,428.

*To all whom it may concern:*

Be it known that I, LOUIS JOLY, a citizen of the Republic of France, residing in Paris, France, have invented certain new and useful Improvements in Apparatus for Measuring the Ratio of Two Electric Currents, of which the following is a specification.

This invention has for its object an apparatus which indicates, by means of an index moving over a dial, the relation of two continuous or alternating currents or a function of that relation or the measure of any magnitude that is measurable by the relation of two currents.

The invention will be described with reference to the accompanying diagrammatic drawings in which—

Figure 1:
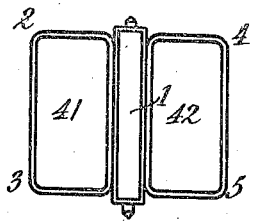
Figure 4:
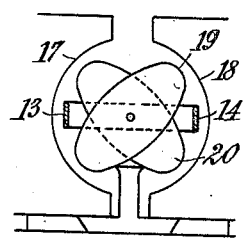
Figure 2:
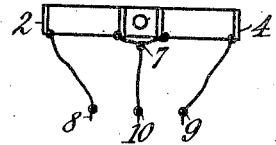
Figure 5:
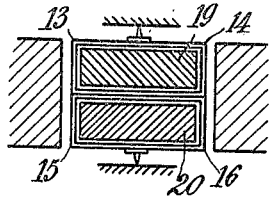
Figure 3:
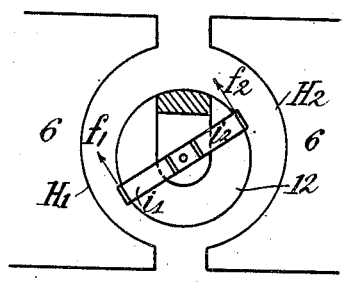

Figures 1 and 2 are respectively an elevation and plan of a pair of coils mounted on an insulating spindle; Fig. 3 is a plan showing the poles of a magnet with interposed U-shaped core; Figs. 4 and 5 are the plan and sectional elevation of a modified arrangement of coils and cores.

The apparatus comprises two coils, analogous to those of the Deprez-d'Arsonval galvanometers, mounted in the same plane on either side of a spindle 1, as indicated in Fig. 1 which spindle constitutes the axis of rotation of the movable mechanisms. The only actions to which the movable mechanisms are subjected, when no current is passing are those due to the connections for the leading in of the current, which connections are formed by means of thin strips of tin foil constituting flexible conductors which introduce merely a negligible couple. The outer sides of the coils 2, 3 and 4, 5 move in a variable air gap of a permanent magnet 6, if the currents of the coil are continuous currents (see Fig. 3) or in the air gap, having a variable field, of an electromagnet excited by an alternating current of the same frequency as the currents of the coils, if these are traversed by an alternating current. The coils being traversed by the currents $i_1$ $i_2$, produce opposing couples; to each value of the ratio $\frac{i_1}{i_2}$ there corresponds a position of equilibrium, and one only, given by the equation $$KH_1 i_1 = H_2 i_2 \quad (1)$$

$H_1$ and $H_2$ being the magnetic fields which act respectively on the outer sides of the coils. For a suitable direction of the currents with regard to the magnetic field, the position of equilibrium of the coil is stable. In fact, one can imagine that the current which traverses the left hand coil (Fig. 3) tends to turn the system of the two coils in the direction of the arrow $f_1$, that is to say in the direction of the diminishing field $H_1$, while the current $i_2$ which traverses the right hand frame tends to turn the system of the two coils, in a direction indicated by the arrow $f_2$. If one supposes that the movable mechanism be in a position of equilibrium defined by the equation (1), and the system of coils is turned in the direction of the arrow $f_1$, the couple due to the current $i_1$ diminishes, since the coil is displaced in the direction of a decreasing magnetic field; for the contrary reason, the couple due to $i_2$ increases; the equilibrium between the two couples is destroyed and the movable system is brought back to the initial position. The same demonstration being applied to the case where the device is turned in the direction of the arrow $f$, the equilibrium is stable. An index attached to the system of the two coils being displaced over a scale, the relation of the two currents may be read off, or a function of that relation if the dial has been graduated for that purpose.

Below, by way of example, are some details of construction of an apparatus of this kind. The windings of two coils 2, 4 and 3, 5, wound inversely on an armature of copper or aluminium in the case where a dead beat is desired, have a common terminal 7, Fig. 2, so that the currents are conducted by three connections only 8, 9, 10. These connections are formed of tin foil exerting extremely feeble forces, and the two coils are mounted on an insulated member 1 which separates them and supports the two pivots. The iron core 12 placed eccentrically between the poles 6 of a permanent magnet, has the form of a U closed at the gap between the two arms by an iron crosspiece $12^1$, Fig. 3. The outline of the polar pieces may be designed in a manner to allow of any degree of sensitiveness. But every arrangement in which two coils are disposed with respect to each other in a manner different from that described above may be considered as a form of this invention, provided they are displaced, one or the other or both, in a variable field. Thus one can imagine an arrangement similar to that which is indicated by Figs. 4 and 5, wherein the two coils 13, 14 and 15, 16 are one below the other, but are each displaced in variable fields 17, 18 to obtain the desired result. In the case of Figs. 4 and 5, the variable field is obtained by means of two superposed cores 19, 20, of oval form. It is obvious that the desired variation of the air gap may be obtained by placing the members 19, 20 concentrically, and imparting such a form to them that the strength of the magnetic field is dependent not on the breadth of the air gap but on the height, or simultaneously on both of these two factors.

The invention may be applied to a great many uses, and many modifications may be made in the structure shown and described without departing from the spirit of the invention.

Having thus described the nature of my said invention and the best means of carrying the same into practical effect I claim:—

1. Apparatus for measuring the relation between two electric currents comprising in combination a magnet, a core intermediate the poles of the magnet and disposed relatively to the poles to produce a variable magnetic field, a movable system comprising a spindle rotatably mounted within the said field, a pair of oppositely disposed coplanar coils carried by the spindle, the said coils being insulated one from another, and means for leading into the coils the said currents so as to produce in the coils opposing couples to shift the movable system into a position of stable equilibrium.

2. An apparatus for measuring the ratio of two electric currents, comprising an electro-magnet, and a rotatable part having two coils symmetrically disposed thereon in the same plane, adapted to be traversed by the currents the ratio of which is to be determined, said rotatable part being mounted unsymmetrically in the field of said magnet, whereby upon deflection of said rotatable part one coil is moved in the direction of the part of greatest density of the field, while the other is moved into a part of less density in reaching an equilibrium.

3. An apparatus for measuring the ratio of two electric currents, comprising an electro-magnet, means for modifying the density of the electro-magnetic field between the pole pieces of said electro-magnet, and a rotatable part having two coils symmetrically disposed thereon in the same plane, adapted to be traversed by the currents the ratio of which is to be determined, said rotatable part being mounted unsymmetrically in the field of said magnet, whereby upon deflection of said rotatable part one coil is moved in the direction of the part of greatest density of the field, while the other is moved into a part of less density in reaching an equilibrium.

4. An apparatus for measuring the ratio of two electric currents, comprising an electro-magnet, a core mounted eccentrically between the poles of said electro-magnet for modifying the density of the electro-magnetic field between the pole pieces of said electro-magnet, and a rotatable part having two coils symmetrically disposed thereon in the same plane, adapted to be traversed by the currents the ratio of which is to be determined, said rotatable part being mounted unsymmetrically in the field of said magnet, whereby upon deflection of said rotatable part one coil is moved in the direction of the part of greatest density of the field, while the other is moved into a part of less density in reaching an equilibrium.

In witness whereof, I have hereunto signed my name in the presence of two subscribing witnesses.

LOUIS JOLY.

Witnesses:
O. BERG,
DEAN B. MASON.